United States Patent
LeBeane et al.

(10) Patent No.: US 10,936,533 B2
(45) Date of Patent: Mar. 2, 2021

(54) GPU REMOTE COMMUNICATION WITH TRIGGERED OPERATIONS

(71) Applicant: Advanced Micro Devices, Inc., Sunnyvale, CA (US)

(72) Inventors: Michael W. LeBeane, Austin, TX (US); Steven K. Reinhardt, Vancouver, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 392 days.

(21) Appl. No.: 15/297,079

(22) Filed: Oct. 18, 2016

(65) Prior Publication Data

US 2018/0107627 A1    Apr. 19, 2018

(51) Int. Cl.
*G06F 15/16* (2006.01)
*G06F 15/173* (2006.01)
*H04L 12/861* (2013.01)
*H04L 12/863* (2013.01)

(52) U.S. Cl.
CPC ........ *G06F 15/17331* (2013.01); *H04L 47/50* (2013.01); *H04L 49/9063* (2013.01)

(58) Field of Classification Search
CPC .................................................... G06T 15/005
USPC ......................................................... 709/212
See application file for complete search history.

(56) References Cited

U.S. PATENT DOCUMENTS

| 5,278,956 | A | 1/1994 | Thomsen et al. |
| 8,131,814 | B1 | 3/2012 | Schlansker et al. |
| 9,602,437 | B1* | 3/2017 | Bernath ............. H04L 49/3054 |
| 10,062,137 | B2* | 8/2018 | Roy ........................ G06F 12/04 |
| 2010/0013839 | A1* | 1/2010 | Rawson .................... G06F 3/14 |
| | | | 345/502 |
| 2013/0069943 | A1* | 3/2013 | Kallio ................... G06T 15/005 |
| | | | 345/420 |
| 2013/0159563 | A1 | 6/2013 | Diard |
| 2014/0192069 | A1* | 7/2014 | Raikin .................... G06F 13/38 |
| | | | 345/520 |

(Continued)

FOREIGN PATENT DOCUMENTS

| EP | 1 921 583 A2 | 5/2008 |
| JP | 2007316859 A2 | 12/2007 |

(Continued)

OTHER PUBLICATIONS

Stuart, J. et al., "Message Passing on Data-Parallel Architectures", International Parallel and Distributed Processing Symposium, May 23-29, 2009, pp. 1-12, IEEE, Rome, IT.

(Continued)

*Primary Examiner* — Hamza N Algibhah
(74) *Attorney, Agent, or Firm* — Volpe and Koenig, P.C.

(57) ABSTRACT

Methods, devices, and systems for transmitting data over a computer communications network are disclosed. A queue of communications commands can be pre-generated using a central processing unit (CPU) and stored in a device memory of a network interface controller (NIC). Thereafter, if a graphics processing unit (GPU) has data to communicate to a remote GPU, it can store the data in a send buffer, where the location in the buffer is pointed to by a pre-generated command. The GPU can then signal to the interface device that the data is ready, triggering execution of the pre-generated command to send the data.

20 Claims, 6 Drawing Sheets

(56) References Cited

U.S. PATENT DOCUMENTS

| | | |
|---|---|---|
| 2014/0285502 A1 | 9/2014 | Hobbs |
| 2014/0331230 A1 | 11/2014 | Reinhardt et al. |
| 2014/0362102 A1* | 12/2014 | Cerny .................. G06T 1/20 345/589 |
| 2015/0039793 A1* | 2/2015 | Rossetti ............... H04L 49/90 710/105 |
| 2015/0206269 A1* | 7/2015 | Qin ..................... G06F 17/2235 715/202 |
| 2015/0288624 A1* | 10/2015 | Raindel .............. H04L 49/90 709/219 |
| 2016/0117277 A1* | 4/2016 | Raindel ............... G06F 13/385 710/112 |
| 2016/0162439 A1 | 6/2016 | Cheng et al. |
| 2016/0328816 A1* | 11/2016 | Boyd ................... G06F 9/451 |
| 2016/0378709 A1* | 12/2016 | Menachem .......... G06F 13/4282 710/308 |
| 2017/0061566 A1* | 3/2017 | Min ..................... G06T 1/20 |
| 2017/0221173 A1* | 8/2017 | Acharya ............... G06T 1/20 |
| 2018/0004693 A1* | 1/2018 | MacNamara ......... G06F 13/28 |
| 2018/0040097 A1* | 2/2018 | Saleh ................... G06T 1/20 |

FOREIGN PATENT DOCUMENTS

| | | |
|---|---|---|
| JP | 2013537993 T2 | 10/2013 |
| WO | 2013136355 A1 | 9/2013 |

OTHER PUBLICATIONS

Oden, L. et al., "Infiniband-Verbs on GPU: A case study of controlling an Infiniband network device from the GPU", International Parallel and Distributed Processing Symposium, May 19-23, 2014, 8 pgs., IEEE, Phoenix, AZ, USA.

Mellanox, GPUDirect RDMA User Manual, 2015, 11 pgs., Rev. 1.2, Sunnyvale, CA, USA.

Barrett, B. et al., "The Portals 4.0.2 Network Programming Interface" Oct. 2014, 154 pgs. Sandia National Laboratories, USA.

* cited by examiner

GPU REMOTE COMMUNICATION WITH TRIGGERED OPERATIONS

GOVERNMENT RIGHTS

This invention was made with government support under Design Forward 2 System Integration Project with Lawrence Berkeley National Laboratory (Prime Contract Number DE-AC02-05CH11231, Subcontract No. 7216338), awarded by the United States Department of Energy. The government has certain rights in the invention.

BACKGROUND

Direct Memory Access (DMA) is a technique by which the main memory of a computer system can be accessed by certain peripheral hardware directly, without individual read/write operations executed by the central processing unit (CPU). Such peripheral hardware can include graphics processors (GPUs), network interface controllers (NICs) or other devices, such as other kinds of input/output (I/O) devices.

Remote Direct Memory Access (RDMA) is a technique by which one computer or processing device can access the main memory of another computer or processing device over a network, without involving the CPU or operating system of either computer. Both DMA and RDMA can have the advantage of allowing a CPU to perform other functions during a data transfer between the main memory and the hardware subsystem, or between main memories of two computer systems. Both DMA and RDMA can also have the advantage of increasing data transfer rate over techniques requiring more intervention from the CPU, and can reduce or eliminate buffering.

GPUs typically cannot control network devices. A CPU-based communication library or other software running on the CPU can be required to communicate between distributed GPUs. Constructing communications network commands, such as read and write request packets or put and get commands, using a GPU results in poor performance as this operation is serial in nature and cannot be effectively parallelized across the GPU.

BRIEF DESCRIPTION OF THE DRAWINGS

A more detailed understanding can be had from the following description, given by way of example in conjunction with the accompanying drawings wherein.

DETAILED DESCRIPTION

Figure 1:
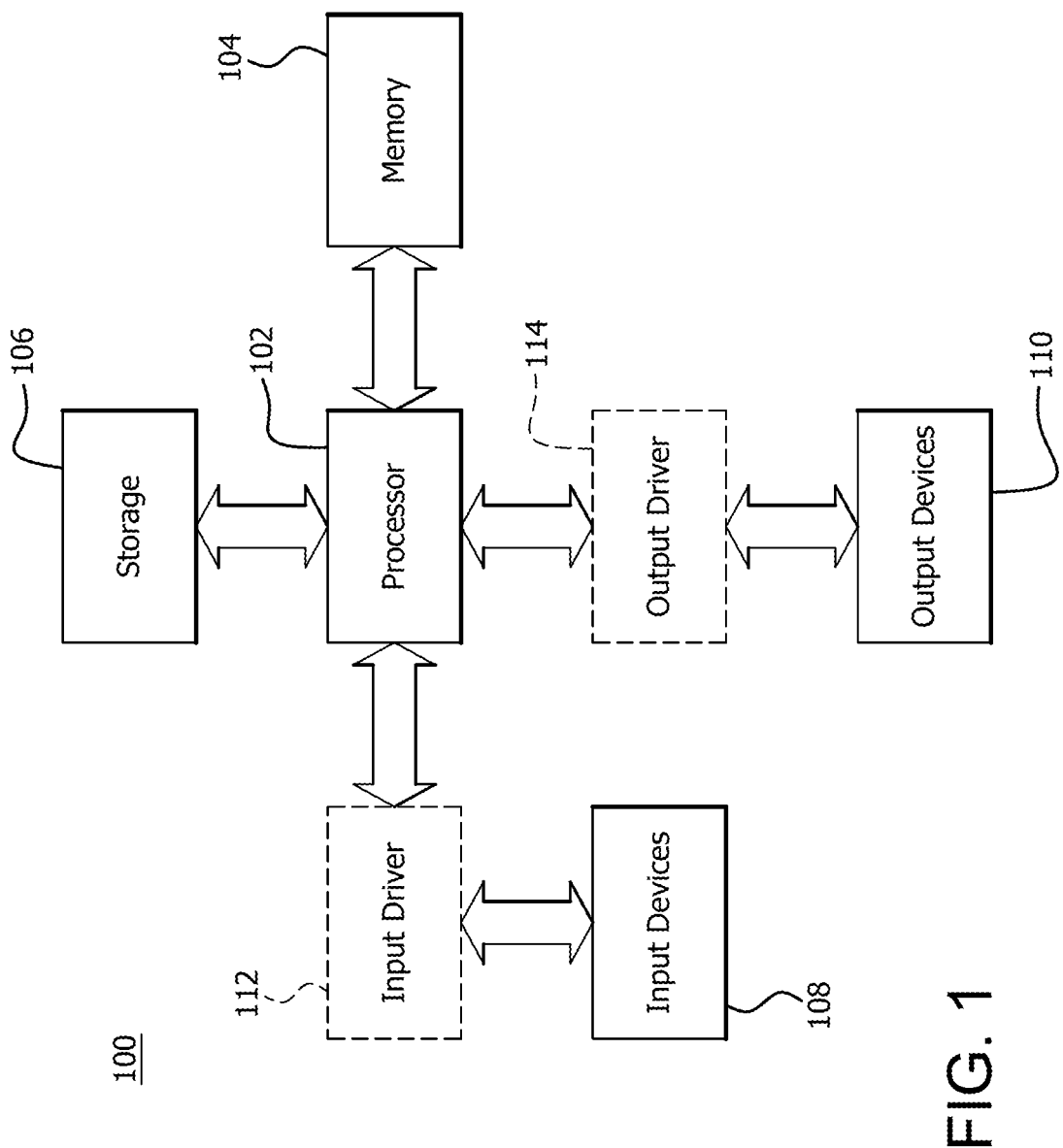
FIG. 1 is a block diagram of an example device in which one or more disclosed embodiments can be implemented.

Multi-node GPU clusters are computer clusters where each of the connected computers includes one or more GPUs. Various operations of a GPU cluster may require RDMA communication of the output of one GPU in the cluster for consumption by a GPU in a different node of the cluster. GPUs currently cannot source RDMA communications without the help of critical path software running on aCPU, and cannot efficiently generate communications network commands. As a result, GPU-GPU RDMA is typically inefficient, and typically requires a CPU to initiate the communications. This can be undesirable, as one potential advantage of RDMA is to free the CPU for other tasks.

Accordingly, strategies for RDMA between two GPUs are discussed herein which address these shortcomings by pre-generating a queue of communications command packets using a CPU. Thereafter, if a GPU has data to communicate to a remote GPU, it can store the data in a send buffer, such as a portion of system memory or local GPU memory, where the location in the buffer is pointed to by a pre-generated command. The GPU can then signal to the interface device that the data is ready in the buffer, triggering execution of the pre-generated command to send the data. In this way, the GPU does not need to generate communications commands, and the CPU does not need to generate the commands during the critical path of the communications operation.

Some embodiments provide a method for transmitting data. An interface device can receive a pre-generated network command from a central processing unit (CPU). The interface device can receive a signal from a graphics processing unit (GPU) indicating that data is ready in a memory. The interface device can execute the pre-generated network command based on the signal, to transmit the data to a target device over a network.

In some embodiments, the pre-generated network command includes a put command. The signal can indicate a change in a value of a counter variable. The pre-generated network command can include a pointer to an address in the memory. The pre-generated network command can include information indicating the target device. The pre-generated network command can include a threshold indicating how many signals are required to initiate the remote put operation. The information can include metadata. The interface device can include a network interface controller (NIC).

Some embodiments provide a device for transmitting data. The device can include receiver circuitry configured to receive a pre-generated network command from a central processing unit. The receiver circuitry can be configured to receive a signal from a graphics processing unit indicating that data is ready in a memory. The device can include processor circuitry configured to execute the pre-generated network command based on the signal. The device can include transmitter circuitry configured to transmit the data to a target device over a network based on the pre-generated network command.

In some embodiments, the pre-generated network command includes a put command. The signal can indicate a change in a value of a counter variable. The pre-generated network command can include a pointer to an address in the memory. The pre-generated network command can include information indicating the target device. The information can include metadata. The interface device can include a network interface controller (NIC).

Some embodiments provide a system for transmitting data. The system can include one or more central processing units (CPUs) and one or more graphics processing unit (GPUs. The CPU can include processing circuitry configured to generate a plurality of pre-generated network commands, and transmitter circuitry configured to transmit the pre-generated network commands to an interface device.

The GPU can include processing circuitry configured to generate data for transmission to a target device over a network, storage circuitry configured to store the data in a buffer, and transmitter circuitry configured to signal to the interface device that the data is stored in the buffer such that the interface device executes one of the plurality of pre-generated network commands.

In some embodiments, the CPU and the GPU are located on a single die. The CPU and the GPU can be located within the same package. The interface device can include a network interface controller (NIC).

FIG. 1 is a block diagram of an example device 100 in which one or more disclosed embodiments can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

The processor 102 can include a central processing unit (CPU), a graphics processing unit (GPU), a CPU and GPU located on the same die, or one or more processor cores, wherein each processor core can be a CPU or a GPU. The memory 104 can be located on the same die as the processor 102, or can be located separately from the processor 102. The memory 104 can include a volatile or non-volatile memory, for example, random access memory (RAM), dynamic RAM, or a cache.

The storage 106 can include a fixed or removable storage, for example, a hard disk drive, a solid state drive, an optical disk, or a flash drive. The input devices 108 can include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 can include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
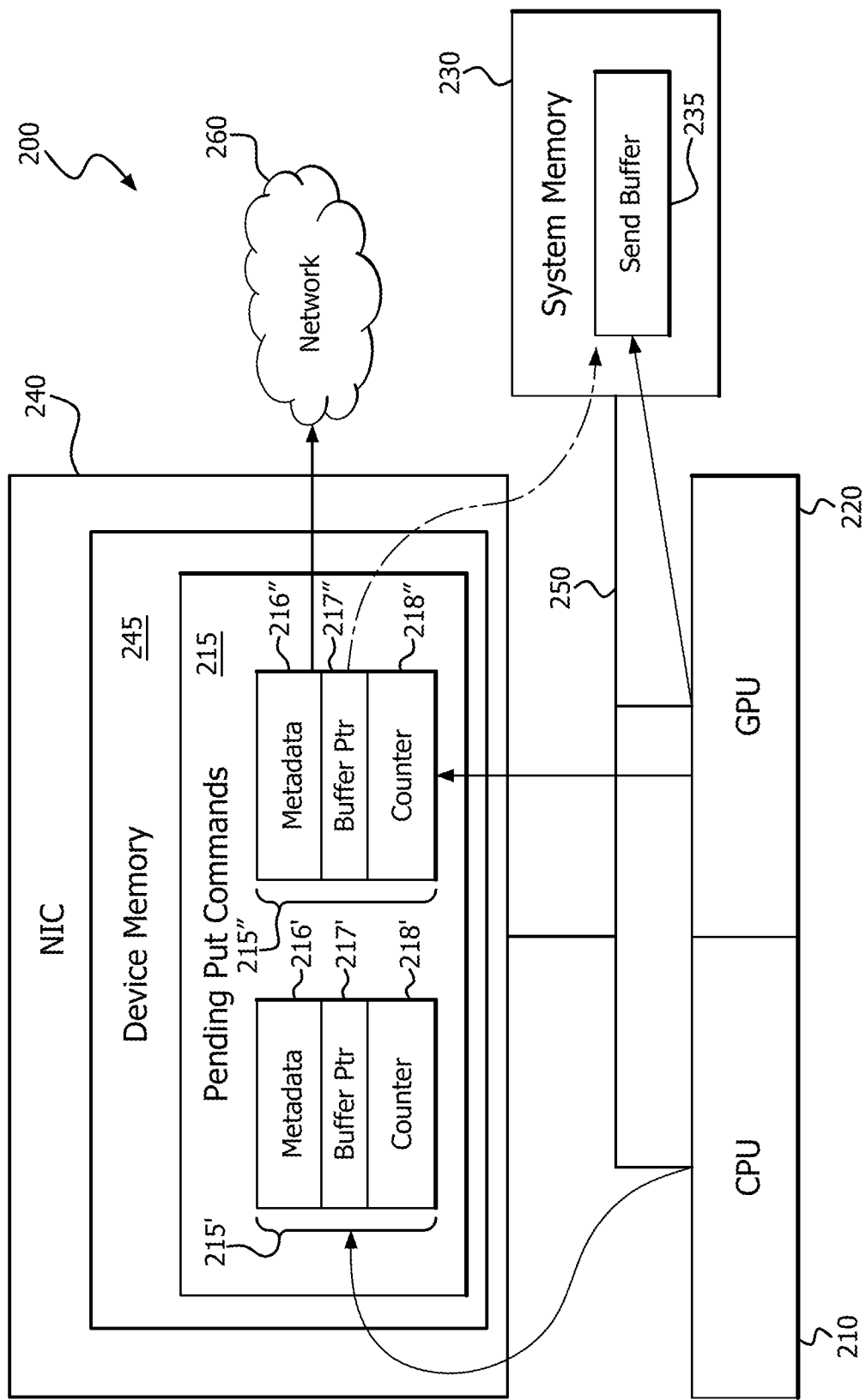
FIG. 2 is a system diagram showing an example topology.

FIG. 2 is a system diagram showing an example topology 200 which illustrates aspects of GPU remote communication. Topology 200 includes CPU 210, GPU 220, system memory 230, NIC 240, local interconnect 250 and computer communications network 260.

CPU 210 includes any suitable general purpose processing unit or processor core. GPU 220 includes any suitable graphics processing unit or graphics processor core. CPU 210 and GPU 220 can be disposed on separate dies or packages, or can be cores on the same die, such as in an accelerated processing unit (APU). CPU 210 and GPU 220 can be implemented, for example, on a single die as processor 102 (shown and described with respect to FIG. 1.)

System memory 230 includes any suitable non-transitory computer readable memory, such as a random access memory (RAM). System memory 230 can be implemented, for example, as memory 104 (shown and described with respect to FIG. 1.) System memory 230 is in communication with CPU 210 and CPU 220 over local interconnect 250. Local interconnect 250 can include any suitable bus or other medium for interconnecting peripheral devices within a computer, such as a Peripheral Component Interconnect Express (PCIe) bus.

Network 260 includes any suitable computer communications network for communicating with a remote system, such as an InfiniBand network, and/or the Internet or any portion thereof, using RDMA. The RDMA target can be a memory in a system which includes another GPU in this example. The RDMA target can also be any consumer of output data from GPU 220.

NIC 240 is coupled to local interconnect 230, and provides communications to network 260 for CPU 210, GPU 220, and system memory 230 via local interconnect 250. Example topology 200 employs a NIC for these communications. Communications to network 260 can also be provided by any other suitable I/O device. NIC 240 includes a device memory 245.

CPU 210 generates one or more remote put commands 215 and stores them in the device memory 245 of NIC 240 over local interconnect 250. In this example, the remote put commands 215 are stored in the device memory 245 of the NIC 240. Remote put commands can also be stored in any suitable memory, such as system memory 230. Remote put commands are used for this example, and other examples herein. Other network messages or communications operations that support triggered semantics can also be used, including but not limited to, collective operations, remote get commands, and two-sided send/receive pairs. Remote put commands 215 include information relating to the RDMA target destination, and to the data to be sent. For example, remote put command 215' includes metadata 216' which specifies the RDMA target destination such that the data is properly directed to the target by the NIC. Metadata 216' can also include a counter value or other information relating to a trigger condition for put command 215' (as will be described further herein), and can also include other information. Remote put command 215' also includes buffer pointer 217', which points to an address or address range in a send buffer 235 in system memory 230.

Each remote put command 215 is also associated with a trigger, by which NIC 240 can determine when to execute the command. In this example, remote put command 215' is associated with a counter value 218'. Remote put command 215" can be associated with a different counter value 218", as well as a buffer pointer 217" and metadata 216". Counter values are used as triggers in this example. The trigger can also be any suitable predefined event, such as the GPU setting a flag or other register, in the device memory 245 or system memory 230, which corresponds to the desired pending put command or the next pending put command in a queue depending on the desired implementation.

In some implementations, CPU 210 pre-generates remote put commands 215 which can include metadata indicating a target, a pointer indicating a source, a threshold value indicating the number of triggers to wait for before sending the message, and/or any other protocol specific information needed to send a network message to a remote target. This command packet can be communicated to the NIC via a command interface and can be stored in internal NIC memory or in global system memory. The NIC can assign a counter from a pool of local memory or from global system memory to each message to track the number of triggers received from a GPU.

GPU 220 executes a kernel during its operation, which can yield data for transfer to a remote GPU over network 260. If such data becomes available, GPU 220 writes the data to send buffer 235 of system memory 230. In this example, the send buffer is implemented in system memory. The send buffer could also be implemented in any suitable memory, such as in a local memory of GPU 220, possibly depending upon the availability of such memory in a particular implementation.

After the data in the send buffer 235 is visible to NIC 240, GPU 220 signals NIC 240 to execute one of the pending put commands 215. The GPU can use appropriate memory fences to ensure that all modified data has been flushed to the send buffer and is visible to the NIC. In this example, GPU 220 performs an operation signaling the NIC 240 to decrement the counter 218" associated with put command 215". The operation can be a global atomic memory update, a memory-mapped register write, or any other suitable triggering mechanism. The counter variable can be stored in device memory 245, or any other suitable location. If the current value of the counter 218" following the decrement matches the threshold contained in metadata 216" of pending remote put command 215" for example, NIC 240 executes remote put command 215" and transmits the data at the location in send buffer 235 which is pointed to by buffer pointer 217" to a RDMA target indicated by metadata 216" over network 260.

One possible implementation of the GPU triggering the NIC is illustrated by the pseudocode in the following table 1:

TABLE 1

```
__kernel void
example1(__global *counter, __global *send_buffer)
{
    // populate send_buffer
    atomic_dec(counter);
    // do additional work
}
```

The pseudocode of table 1 uses global atomics to activate a put operation for the NIC by a GPU. In this example, the NIC can efficiently wait on the counter using mwait-like semantics where the NIC does not need to poll on the memory address and can receive a notification when the memory value changes. This can have the advantage of avoiding unnecessary transfer of control of the cache line between the NIC cache and the GPU cache. This example assumes a unified, HSA-like address space.

Another possible implementation of the GPU triggering the NIC is illustrated by the pseudocode in the following table 2:

TABLE 2

```
__kernel void
example2(__global *global_flag, __local *local_counter, __global *send_buffer)
{
    // populate send_buffer
    atomic_dec(local_counter);
    if (!local_counter)
        *global_flag = 0;
    // do additional work
}
```

The pseudocode of table 2 uses a two-stage notification with local LDS synchronization and a global flag. This approach synchronizes within a workgroup using a local counter before having a single workitem trigger the message by writing to a global signal. This approach can be subject to control divergence. This approach also simplifies the design of the NIC using a flag which can be implemented as a simple memory-mapped doorbell register.

Figure 3:
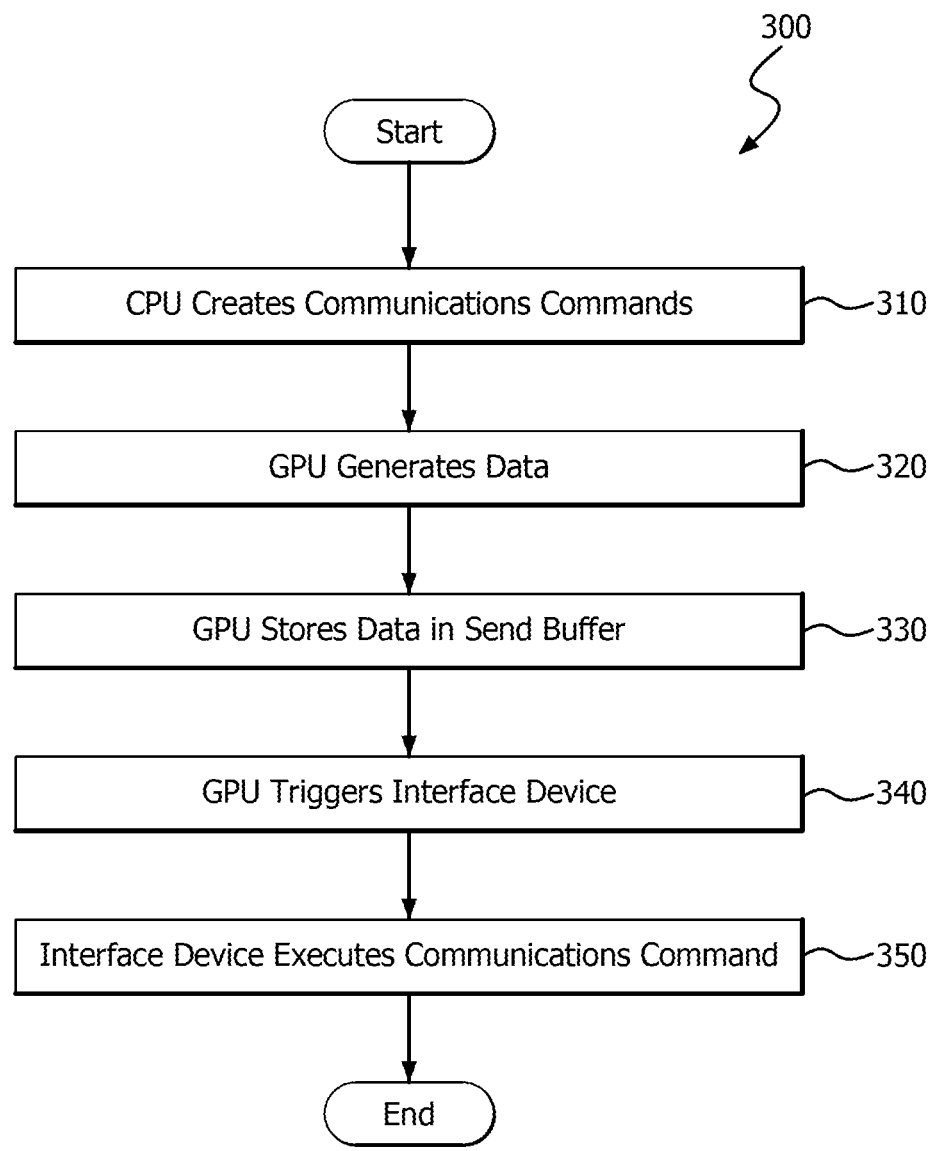
FIG. 3 is a flow chart showing an example method which can be employed using the example topology of FIG. 2 and/or the example device of FIG. 1.

FIG. 3 is a flow chart showing an example method 300 which illustrates aspects of GPU remote communication, and can be employed, for example, using example topology 200 and/or example device 100.

In step 310, a CPU (such as CPU 210) of a computer system generates one or more communications commands, such as remote put commands (such as remote put commands 215), and stores these commands in a queue on a NIC (such as NIC 240) or other interface device. Each communications command includes a pointer to a send buffer. The send buffer is a portion of a system memory (such as system memory 230) of the computer system in this example. The send buffer could also be a portion of a GPU local memory, or another memory, in other implementations.

In step 320, a GPU (such as GPU 220) of the computer system generates data for communication to a GPU of another computer system. For example, the GPU can execute a kernel which yields data for consumption by a remote GPU. In step 330, the GPU stores the generated data in the send buffer. In step 340, the GPU signals the NIC that data is ready in the send buffer. In this example, the GPU signals that data is ready to send by decrementing a counter variable stored in a memory, such as the NIC's device memory, or system memory. In other implementations the GPU can signal the NIC or other interface device that data is ready in the send buffer in any other suitable way, such as by setting a value of a register in the device memory of the NIC or in the main system memory.

In step 350, the interface device executes one of the communications commands based on the signal from the GPU. For example, if the signal is a decremented counter variable associated with a pre-generated put command, the interface device can compare the counter variable to a threshold included in the communications commands. If the counter variable matches the value of a stored threshold of one of the plurality of commands, the NIC executes that command. Executing the communications command can cause the NIC to transmit data in the send buffer (e.g., at a location pointed to by a pointer in the communications command) to a target specified in the communications command (e.g., memory of a remote GPU) over a computer communications network.

It is noted that step 310 is shown sequentially with steps 320-350. CPU creation of communications commands can also occur at any suitable time prior to, and independent of the other steps. This can have the advantage of removing the CPU from the critical path of RDMA operations.

Figure 4:
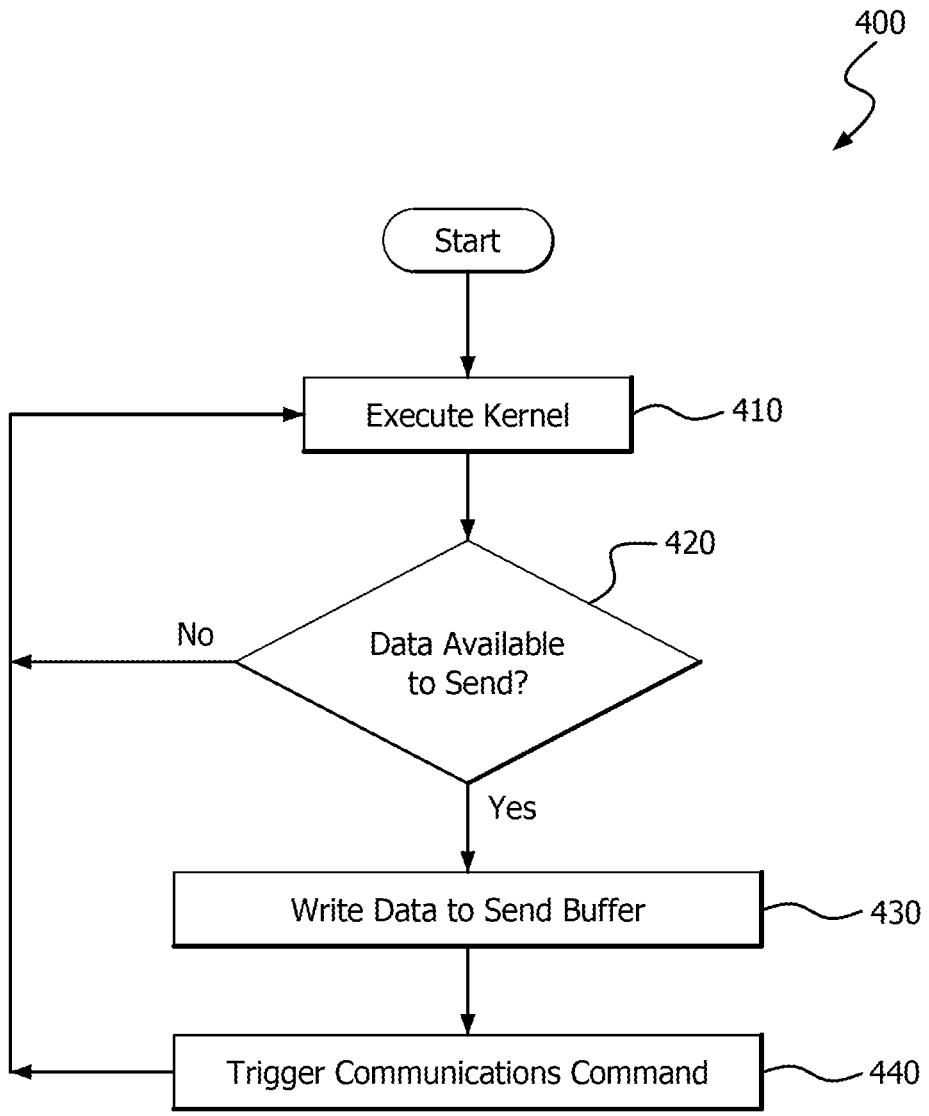
FIG. 4 is a flow chart showing an example method which can be employed using a GPU in the example topology of FIG. 2 and/or the example device of FIG. 1.

FIG. 4 is a flow chart showing an example method 400 which illustrates aspects of GPU remote communication, and can be employed for example using a GPU in example topology 200 and/or example device 100.

In step 410, a GPU (such as GPU 220) executes a kernel and generates data for transmission to a remote memory location over a computer communications network. The remote memory location may be a device memory of a remote GPU, system memory of a remote device that is accessible to a remote GPU, or any suitable RDMA target.

On a condition 420 that the data is available (e.g., the GPU has completed executing the kernel or a particular workgroup, yielding data for transmission to a remote memory), the GPU writes the data to a send buffer in step 430. In this example the send buffer is implemented in system memory. The send buffer can also be implemented in any suitable memory, such as a device memory of the GPU. In step 440, the GPU triggers an interface device to transmit the data in the send buffer over a computer communications network to the remote GPU or other target using any suitable signaling technique, such as those described herein. For example, the GPU may decrement a counter variable to signal the interface device to execute a pre-stored remote put command having an associated threshold value which matches the decremented counter variable.

Figure 5:
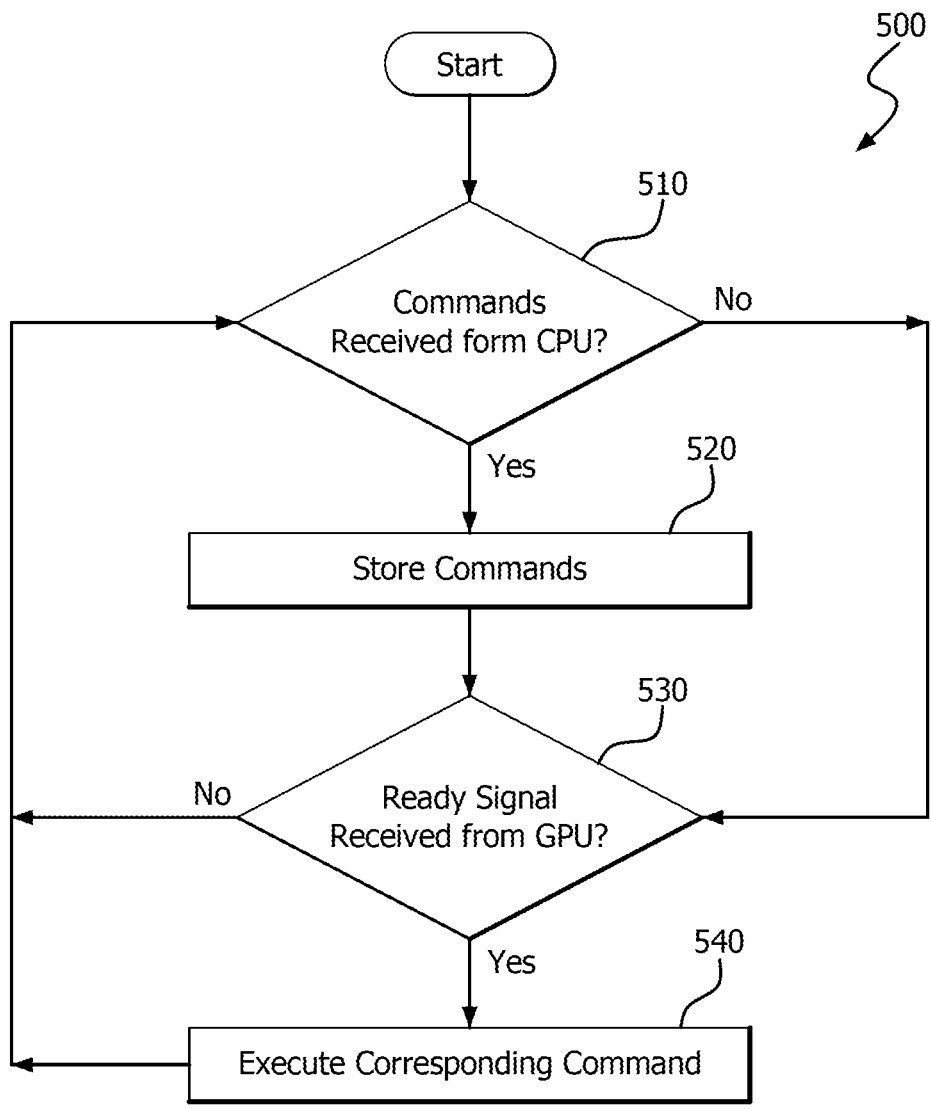
FIG. 5 is a flow chart showing an example method which can be employed using a NIC in the example topology of FIG. 2 and/or the example device of FIG. 1.

FIG. 5 is a flow chart showing an example method 500 which illustrates aspects of GPU remote communication, and can be employed for example using a NIC in example topology 200 and/or example device 100.

On a condition 510 that a NIC receives pre-generated remote put commands from a CPU, the NIC stores the remote put commands in its device memory in step 520. Otherwise, or after storing the remote put commands, the NIC determines whether a data ready signal has been received from a GPU. For example, the NIC may compare the value of a counter variable in system memory, which can be decremented by the GPU, to a threshold value of one or more of the remote put commands, or may test the value of a flag or doorbell buffer which can be set by the GPU. On a condition 530 that a ready signal is received from the GPU, and assuming that a corresponding pre-stored put command is stored in the local device memory, the NIC executes the pre-stored remote put command to transmit data stored in a send buffer at an address indicated by a pointer in the remote put command over a computer communications network to a memory in a remote system, such as a GPU memory, system memory, or other suitable RDMA target. The NIC can then resume monitoring for new ready signals from the GPU or pre-generated communications commands from the CPU.

Steps 510 and 520, as shown in FIG. 5, do not necessarily execute sequentially with steps 530 and 540. For example, after storing communications commands in step 520, the NIC can monitor for a ready signal from the GPU in step 530 indefinitely without receiving any additional pre-generated put commands in step 510. Thus, CPU creation of communications commands can occur at any suitable time prior to, and independent of the other steps. This can have the advantage of removing the CPU from the critical path of RDMA operations.

Figure 6:
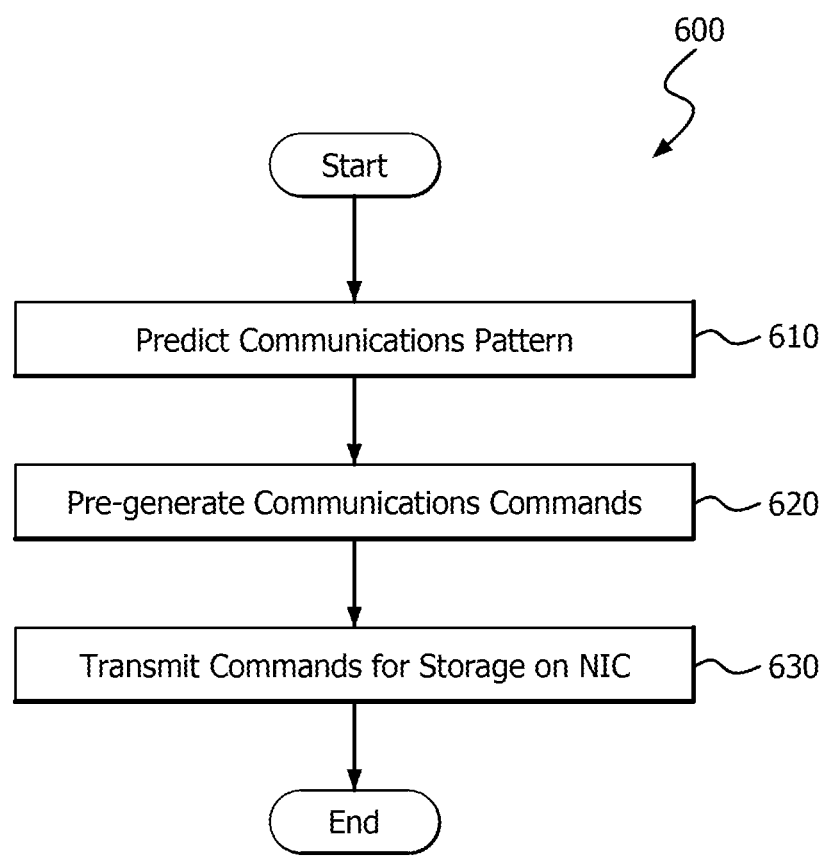
FIG. 6 is a flow chart showing an example method which can be employed using a CPU in the example topology of FIG. 2 and/or the example device of FIG. 1.

FIG. 6 is a flow chart showing an example method 600 which illustrates aspects of GPU remote communication, and can be employed for example using a CPU in example topology 200 and/or example device 100.

In step 610, a future communications pattern for the output of a GPU is determined or predicted. In step 620, a CPU generates one or more communications commands based on the communications pattern. The communications commands can be remote put commands, for example, and can include a pointer to a send buffer which will store data from a GPU, information indicating a destination for the data, and possibly a counter value or other trigger information. In step 630, the CPU transmits the communications commands to an NIC or other suitable interface device for storage in a device memory of the NIC or other suitable memory.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for transmitting data, the method comprising:
receiving, by an interface device, a pre-generated network remote communications command from a central processing unit, wherein the pre-generated network remote communications command includes a threshold value that indicates a number of triggers to wait for before sending a message specified by a pending put command;
receiving, by the interface device, a signal from a graphics processing unit indicating that data is ready in a memory, wherein the signal comprises a trigger;
determining that, after receiving the trigger from the graphics processing unit, a number of triggers experienced by the interface device matches the threshold value stored in the pre-generated network remote communications command; and
in response to the determining, executing, by the interface device, the pre-generated network command based on the signal, to transmit the data to a remote target device over a network.

2. The method of claim 1, wherein the pre-generated network remote communications command comprises a put command.

3. The method of claim 1, wherein the signal indicates a change in a value of a counter variable.

4. The method of claim 1, wherein the pre-generated network remote communications command comprises a counter variable threshold.

5. The method of claim 1, wherein the pre-generated network remote communications command comprises a pointer to an address in the memory.

6. The method of claim 1, wherein the pre-generated network remote communications command comprises information indicating the remote target device.

7. The method of claim 6, wherein the information comprises metadata.

8. The method of claim 1, wherein the interface device comprises a network interface controller (NIC).

9. A device for transmitting data, the device comprising:
receiver circuitry configured to receive a pre-generated network remote communications command from a central processing unit, wherein the pre-generated network remote communications command includes a threshold value that indicates a number of triggers to wait for before sending a message specified by a pending put command;
the receiver circuitry further configured to receive a signal from a graphics processing unit indicating that data is ready in a memory, wherein the signal comprises a trigger;
processor circuitry configured to determine that, after receiving the trigger from the graphics processing unit, a number of triggers experienced by the interface device matches the threshold value stored in the pre-generated network remote communications command, and in response to the determining, execute the pre-generated network command based on the signal; and
transmitter circuitry configured to transmit the data to a remote target device over a network based on the pre-generated network command.

10. The device of claim 9, wherein the pre-generated network remote communications command comprises a put command.

11. The device of claim 9, wherein the signal indicates a change in a value of a counter variable.

12. The device of claim 9, wherein the pre-generated network remote communications command comprises a counter variable threshold.

13. The device of claim 9, wherein the pre-generated network remote communications command comprises a pointer to an address in the memory.

14. The device of claim 9, wherein the pre-generated network remote communications command comprises information indicating the target device.

15. The device of claim 14, wherein the information comprises metadata.

16. The device of claim 9, wherein the device comprises a network interface controller (NIC).

17. A system for transmitting data, the system comprising:
a central processing unit (CPU); and
a graphics processing unit (GPU);
the CPU comprising processing circuitry configured to generate a plurality of pre-generated network remote communications commands, and transmitter circuitry configured to transmit the pre-generated network remote communications commands to an interface device, wherein the pre-generated network remote communications commands include threshold values that indicates a number of triggers to wait for before sending a message specified by a pending put command;
the GPU comprising processing circuitry configured to generate data for transmission to a remote target device over a network, storage circuitry configured to store the data in a buffer, and transmitter circuitry configured to signal to the interface device that the data is stored in the buffer such that the interface device executes one of the plurality of pre-generated network remote communications commands.

18. The system of claim 17, wherein the CPU and the GPU are disposed on a single die.

19. The system of claim 17, wherein the CPU and the GPU are disposed within the same package.

20. The system of claim 17, wherein the interface device comprises a network interface controller (NIC).

* * * * *